May 19, 1953  J. N. HUMBER ET AL  2,639,036
FILTERING APPARATUS

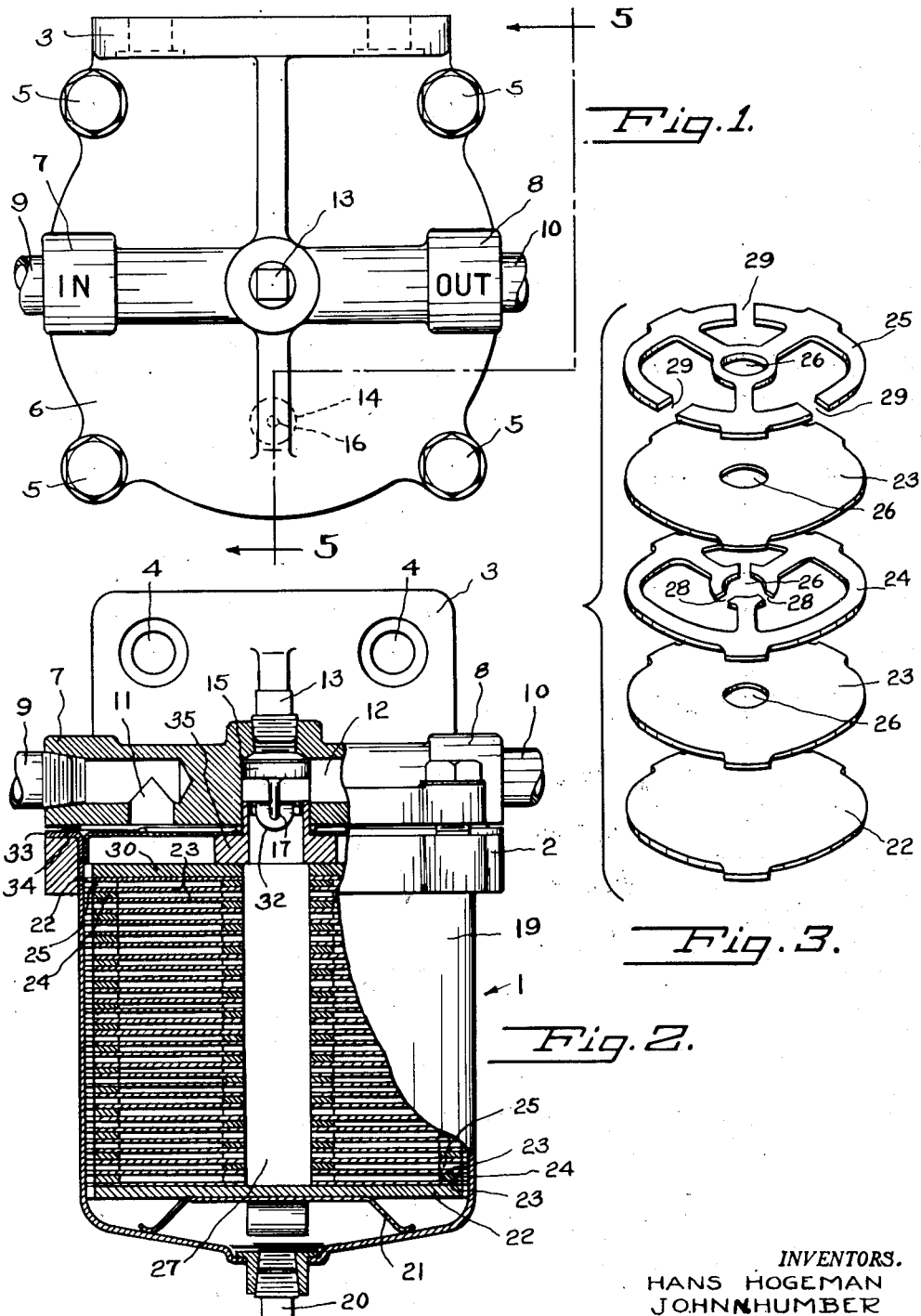

Filed Feb. 19, 1949   2 Sheets-Sheet 2

INVENTORS.
HANS HOGEMAN
JOHN N. HUMBER
PAUL G. BJRMAN
BY Raymond A. Vaquin
ATTORNEY.

Patented May 19, 1953

2,639,036

UNITED STATES PATENT OFFICE 2,639,036

FILTERING APPARATUS

John N. Humber, North Wilbraham, Hans Hogeman, Longmeadow, and Paul G. Burman, Springfield, Mass., assignors to American Bosch Corporation, Springfield, Mass., a corporation of New York Application February 19, 1949, Serial No. 77,404

4 Claims. (Cl. 210—185)

This invention relates to filters and has particular reference to a new and improved oil filtering apparatus.

An object of the invention is to provide a new and improved oil filtering apparatus wherein the filter is in the form of a completely sealed interchangeable cartridge.

Another object of the invention is to provide a new and improved oil filtering apparatus which is particularly adapted for use in filtering oil for compression ignition engines.

Another object is to provide a filtering apparatus for oil engines in which apparatus the filter cartridge is removable and may be replaced by a completely sealed filtering cartridge.

Other objects and advantages of the invention will be apparent from the following description taken in connection with the accompanying drawing and it will be understood that changes may be made in the details of construction and arrangement of parts without departing from the scope of the invention as set forth in the accompanying claims as the preferred form has been shown by way of illustration only.

Referring to the drawings:

Fig. 1 is a top or plan view of a filtering apparatus embodying the invention;

Fig. 2 is a front view, partly in section, of the apparatus shown in Fig. 1;

Fig. 3 is a fragmentary, exploded view of the filtering element shown in Fig. 2;

Figure 4:
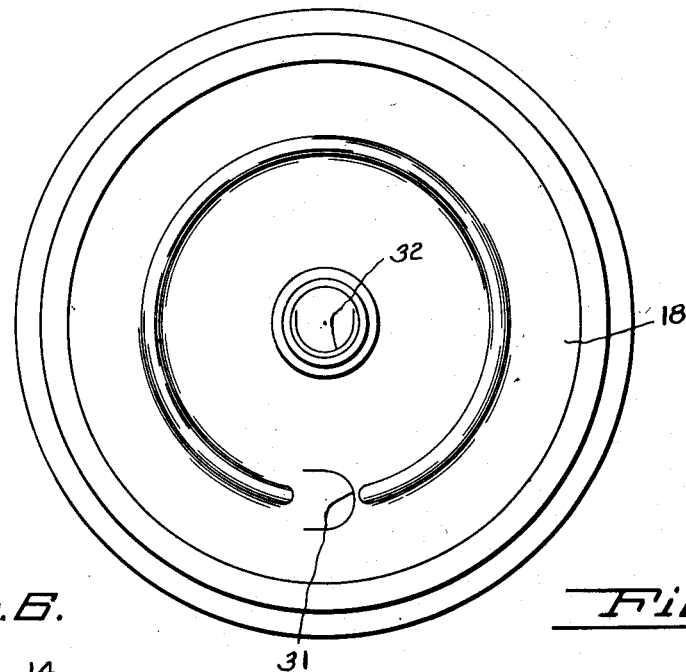
Fig. 4 is a top or plan view of the filter cartridge before the cartridge is placed in operative position in the filtering apparatus.
Figure 6:
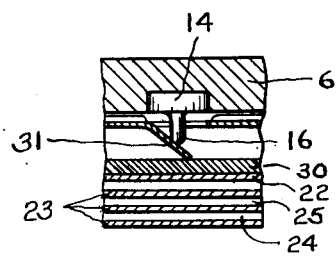
Fig. 6 is a sectional view taken on line 6—6 of Fig. 5 looking in the direction of the arrows.

Referring more particularly to the drawings wherein similar reference characters designate corresponding parts throughout the several views, the device shown embodying the invention comprises a filter element or cartridge assembly 1, the ring clamp 2 and supporting bracket 3 adapted to be secured in position by bolts or screws through the openings 4 to retain the filtering apparatus in position on the engine.

The ring clamp 2 is secured to the bracket 3 by means of the bolts 5 which extend through openings in the cover portion 6 of the bracket 3 and are threaded into the ring clamp 2. The cover portion 6 is provided with the conduits 7 and 8 which are secured to the oil inlet lines 9 and 10 respectively by the threaded connections shown although other forms of couplings may be employed and the conduits 7 and 8 communicate with the filter through the passageways 11 and 12 whereby oil may pass to the filtering element or cartridge and from said element to the oil supply line.

The cover member 6 is provided with the threaded plug 13 and also has the inserts 14 and 15 having the projections 16 and 17 respectively adapted to automatically open the fuel passageways in the cover 18 of the filter element or cartridge 1 as hereinafter described.

The filter cartridge or element 1 comprises the container 19 of metal or other suitable material and has the threaded plug 20 in the lower side thereof.

Within the hollow container 19 is positioned the spider 21 on which is positioned the cardboard backing 22 over which are positioned the elements 23 of filter paper or other suitable filtering material which are separated by the pressed cardboard spacing elements 24 and 25 as shown.

The filtering elements 23 and the spacers 24 and 25 all have a central opening 26 which form the oil chamber 27 when the members are stacked in aligned relation as shown in Fig. 2.

The spacing elements 24 have the openings 28 communicating with the central opening 26 to allow passage of oil therethrough and the spacer member 25 has similar cut-out portions or openings 29 in the periphery thereof allowing the entrance of oil therethrough to the filtering members 23 from the oil inlet conduit 11.

At the upper end of the filtering element there is positioned a cardboard backing 30 which is similar to the backing 22 previously described.

The cover or cap 18 of the filtering element 19 is secured to the container 19 by soldering or welding or other suitable process after the filter members 23, spacers 24 and 25 and cardboard backings 22 and 30 are positioned within the container 19 as previously described and this cap or cover 18 is provided with the lancings 31 and 32 as shown in Fig. 4 which extend partly through the material of said cover or cap 18, but yet allow said filtering member or container to be completely sealed against dirt or dust and remain sealed until the portions within said lancings 31 and 32 are displaced by the projections 16 and 17 respectively in the inserts 14 and 15 as previously described.

Figure 5:
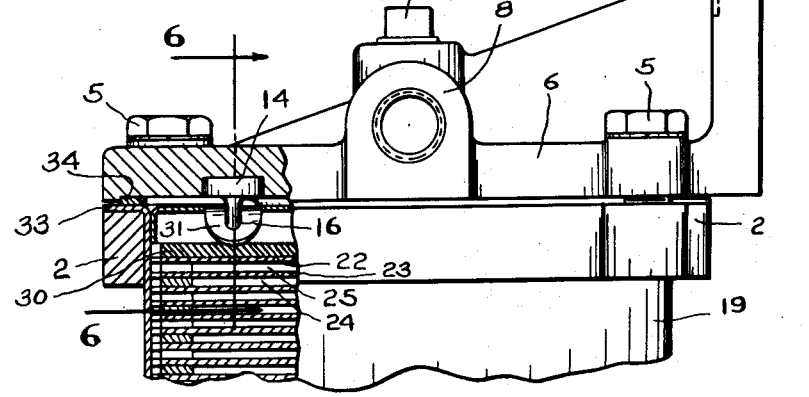
Fig. 5 is a fragmentary view taken on line 5—5 of Fig. 1 looking in the direction of the arrows.

The container 19 of the filtering element is provided with the integral peripheral flange 33 adapted to be positioned on the upper surface of the ring clamp 2 as shown in Fig. 2 and Fig. 5 to retain the filtering element in operative position and the gasket 34 may be provided for sealing purposes.

In the construction and assembly of the filtering apparatus, the filtering element 1 is formed with the filtering members therein as previously described and with the cap or cover 18 secured thereto and sealed as also previously described.

When it is desired to place the filtering element 1 in operative position, the ring clamp 2 is removed by unscrewing the bolts 5 and the filtering element is then inserted through the ring clamp 2 and retained in position therewith by means of the flange 33 which is supported on the ring clamp 2. By then threading the bolts 5 into the threaded openings in the periphery of the ring clamp 2, the ring clamp 2 and filtering element 1 are drawn into close relation with the cover 6 and simultaneously the projections 16 and 17 operate to open the inlet and exit openings in the cover 18 by displacing the portions of the cover within the lancings 31 and 32.

In operation oil passes through the supply line 9, conduit 11 and opening in the cover 18 which is formed by displacing the portion of the cover within the lancing 31 and said oil then flows around the periphery of the cardboard member 30 and through the filtering members 23 and reaches the sump or central accumulator 27 through the cut-outs 28 in the cardboard spacers 24 from which it passes to the supply line 10 through the conduit 12 and the opening in the cover or cap 18 formed by displacing the portion of the cap or cover 18 within the lancing 32.

The filtering element is provided with the outlet bushing 35 which serves to support the cover or cap 18 and also prevent the leakage of oil to the outlet conduit 12 except from the central sump 27.

It will be noted that as there are no openings formed in the cap or cover 18 until it is placed in operative relation on the filtering apparatus, that it is impossible for dirt or dust to pass into the filtering chamber as the filtering element is positively sealed until placed in operative position on the filtering apparatus.

From the foregoing it will be seen that we have provided simple and efficient means for obtaining all of the objects and advantages of the invention.

Having described our invention, we claim:

1. In a device of the character described, a supporting ring, a hollow sealed cartridge container having a peripheral flange adjacent its upper end and substantially parallel with the adjacent upper surface of the container, said container having a filtering element therein, said container being adapted to be positioned within said supporting ring with said peripheral flange positioned on the upper surface of said ring for supporting said container, a bracket member adapted to be supported on said ring and overlying said flange on said container, said bracket having means for attachment thereof to a support and having fittings for connection to the oil supply and delivery lines, said container having a projecting portion on its upper surface adapted to extend into said fitting for said delivery line, said bracket having projections aligned with said supply and delivery fittings adapted to displace portions of the adjacent side of said container to establish communication through the upper surface of said container to said oil supply line and through said projecting portion to said delivery line and means for connecting said bracket to said ring.

2. In a device of the character described, a supporting ring, a hollow sealed cartridge container having a peripheral flange adjacent its upper end and substantially parallel with the adjacent upper surface of the container, said container having a filtering element therein, said container being adapted to be positioned within said supporting ring with said peripheral flange positioned on the upper surface of said ring for supporting said container, a bracket member adapted to be supported on said ring and overlying said flange on said container, said bracket having means for attachment thereof to a support and having fittings for connection to the oil supply and delivery lines, said container having a projecting portion on its upper surface adapted to extend into said fitting for said delivery line, the adjacent side of said container having portions defined by lancings and adapted to be displaced, one of said lancings being in said projecting portion, said bracket having projections adapted to displace said portions of the adjacent side of said container to establish communication between said oil supply and delivery lines and said filtering element and means for connecting said bracket to said ring.

3. A filter member comprising, a sealed container, a filtering element within said sealed container, said container having a peripheral outstanding flange adjacent its upper end and substantially parallel with the adjacent upper surface of the container and adapted to be positioned on a ring for supporting said filter and said container having a projecting portion in its upper surface and being adapted to have portions in its upper surface and said projecting portion displaced for establishing communication between said filtering element and the lines for supplying and delivering oil to and from said filter.

4. A filter member comprising, a sealed container, a filter element within said sealed container, said container having a peripheral outstanding flange adjacent its upper end and substantially parallel with the adjacent upper surface of the container and adapted to be positioned on a ring for supporting said filter and said container having a projecting portion in its upper surface and having portions in its upper surface and said projecting portion defined by lancings and adapted to be displaced for establishing communication between said filtering element and the lines for supplying and delivering oil to and from said filter.

JOHN N. HUMBER.
HANS HOGEMAN.
PAUL G. BURMAN.

References Cited in the file of this patent

UNITED STATES PATENTS

| Number | Name | Date |
|---|---|---|
| 1,581,998 | Fulcher | Apr. 20, 1926 |
| 1,635,563 | Sanford | July 12, 1927 |
| 2,114,485 | Frolander | Apr. 19, 1938 |
| 2,128,589 | Manning | Aug. 30, 1938 |
| 2,184,243 | Belyairn | Dec. 19, 1939 |
| 2,218,338 | Manning | Oct. 15, 1940 |
| 2,218,339 | Manning | Oct. 15, 1940 |
| 2,284,787 | Winkler | June 2, 1942 |
| 2,337,469 | Hill | Dec. 21, 1943 |
| 2,381,354 | Larson | Aug. 7, 1945 |
| 2,382,278 | Widman | Aug. 14, 1945 |